United States Patent Office 2,744,075
Patented May 1, 1956

2,744,075
EXPANDED POLYVINYL CHLORIDE PLASTIC CONTAINING WAX

Winston J. Roberts, Akron, Ohio, assignor, by mesne assignments, to The Goodyear Tire & Rubber Company, a corporation of Ohio No Drawing. Application October 20, 1951, Serial No. 252,415

10 Claims. (Cl. 260—2.5)

This invention relates to a closed cell expanded polyvinyl chloride plastic having an improved compression set.

Cork and kapok have been used in life-saving equipment because they possess a desirable weight/buoyancy ratio. Cork degrades in time and kapok may become compacted and lose its buoyancy. Closed cell expanded vinyl chloride plastics have been used in place of cork and kapok. Even these expanded or sponge plastics have a tendency to become compressed under constant forces of compression. When this occurs its value as a buoy is lessened.

It has now been discovered that closed cell expanded polyvinyl chloride plastics may be made in which the compression set is decreased nearly 70%. This significant improvement in compression set is made possible by means of the discovery that a solid non-flexible and non-stretchable substance added to a plastisol of the plastic unexpectedly improves the ability of the expanded plastic to return to its original shape after it has been distorted by means of compressive forces. Substances that possess this peculiar ability when combined with a plastisol of a polyvinyl chloride plastic are solid hydrocarbon waxes having a melting point of at least 120° F. It has also been discovered that this significant improvement in compression set is made possible when the paraffin wax is added in amounts from 5 to about 25 parts per one hundred parts of the plastic.

The invention is illustrated by the following examples which are by weight unless otherwise indicated.

EXAMPLE 1 (NO WAX)

The following formulation was used in making an expanded polyvinyl chloride plastic:

| | Parts |
|---|---|
| Polyvinyl chloride resin | 100 |
| Octyl diphenyl phosphate as a plasticizer | 56.2 |
| Dioctyl phthalate as a plasticizer | 18.8 |
| Magnesium oxide as a stabilizer | 5.0 |
| p-Tertiary butyl benzazide as a blowing agent | 30.0 |

The polyvinyl chloride in the form of a powder was made into a plastisol by mixing the resin with a plasticizer, using small amounts of the resin and small amounts of the plasticizer as the addition of the one was made to the other in an unheated Baker-Perkins mixer. The stabilizer was also added during the mixing operation. The mix was removed from the mixer as soon as the batch became paste-like. Further additions of plasticizer were made to small portions of the original batch by stirring in with an air stirrer. The final mix was cooled down to room temperature (70° F.) and the blowing agent was then added to the cool mix and then poured into a mold and cured for 10 minutes at 320° F. The cured mix was cooled to room temperature before removing from the mold and then oven expanded for 30 minutes at 275° F. A compression set test was made in accordance with ASTM D395–49T the exception that the vinyl foam samples were compressed 75% instead of the 20–40% used in the ASTM method and the sample was kept in a compressed state for 22 hours at 77° F. A value of 80% was obtained. The expanded plastic had a density of 4.32 pounds per cubic foot.

EXAMPLE 2

The same formulation used in Example 1 was used here with the exception that 15 parts of paraffin wax having a melting point of 135° F. was added. The resulting expanded plastic had a density of 4.32 pounds per cubic foot and a compression set of 30.06%.

EXAMPLE 3

Example 2 was repeated with the exception that in place of polyvinyl chloride a copolymer resulting from the copolymerization of mixture containing 95 parts of vinyl chloride and 5 parts of diethyl maleate was used. The resulting expanded plastic had a density of 4.21 pounds per cubic foot and a compression set of 24.88%.

Waxes having a melting point ranging from 110° F. to 150° F. were used in determining their effect upon the compression set of expanded polyvinyl chloride plastics in the same way in which the wax was used and tested in Example 2. The results of these tests are tabulated in Table I in which the compression set was measured on samples that had been expanded in an oven for 30 minutes at 220° F.

Table I

| Example | Compression Set (Percent) | Melting Point of Wax, ° F. |
|---|---|---|
| 4 | 65 | 110 |
| 5 | 24 | 125 |
| 6 | 15 | 135 |
| 7 | 17 | 150 |

In Table II the compression set was measured on samples that had been expanded in an oven for 30 minutes at 275° F.

Table II

| Example | Compression Set (Percent) | Melting Point of Wax, ° F. |
|---|---|---|
| 8 | 86.5 | 110 |
| 9 | 56.0 | 125 |
| 10 | 38.5 | 135 |
| 11 | 25.0 | 150 |

The effect of the amount of wax used on the compression set is indicated in Table III. The compression set test was made on samples that had been expanded in an oven for 30 minutes at 200° F.

Table III

| Example | Amount of Wax (M. P. 125° F.) | Compression Set (Percent) |
|---|---|---|
| 12 | 0 | 72 |
| 13 | 5 | 30 |
| 14 | 10 | 24 |
| 15 | 15 | 16 |
| 16 | 20 | 22 |
| 17 | 25 | 30 |

| Example | Amount of Wax (M. P. 150° F.) | Compression Set (Percent) |
|---|---|---|
| 18 | 0 | 72 |
| 19 | 5 | 30 |
| 20 | 10 | 18 |
| 21 | 15 | 18 |
| 22 | 20 | 18 |

In Table IV the compression set was measured on samples that had been expanded in an oven for 30 minutes at 275° C:

Table IV

| Example | Amount of Wax (M. P. 125° F.) | Compression Set (Percent) |
|---|---|---|
| 23 | 0 | 83 |
| 24 | 5 | 44 |
| 25 | 10 | 38 |
| 26 | 15 | 30 |
| 27 | 20 | 23 |
| 28 | 25 | 29 |

| Example | Amount of Wax (M. P. 150° F.) | Compression Set (Percent) |
|---|---|---|
| 29 | 0 | 83 |
| 30 | 5 | 43 |
| 31 | 10 | 25 |
| 32 | 15 | 25 |
| 33 | 20 | 34 |

In the foregoing examples the amount of wax is based on 100 parts of resin. Although the examples have been described with respect to the use of a wax having melting point of 125° F., 135° F. and 150° F., any hydrocarbon wax having a melting point between about 120° F. and 150° F. may be used. Suitable hydrocarbon waxes include paraffin, ceresin, ozokerite, and montan wax. Carnauba wax may also be used. For a more detailed description of paraffin waxes reference may be had to U. S. Patent 2,361,582. The waxes described in this patent having a melting point of at least 120° F. may also be used in the practice of the present invention.

It is preferable in obtaining optimum results to use about 15 parts of wax per hundred parts of plastic. However, results are also obtained when the wax is used in amounts of 5 to 25 parts per one hundred parts of plastic.

The preferred plastic in producing expanded structures is polyvinyl chloride. Expanded structures having an improved compression set may also be made from plastics in which the major component is a polyvinyl halide. The vinyl halide copolymers which may be treated in accordance with this invention include the copolymers of the vinyl halides of the group consisting of vinyl chloride and vinyl bromide. The vinyl halide copolymers are copolymers from 70 to 90% of the vinyl halide and from 2 to 30% of another polymerizable mono olefinic compound. Specific monomers that may be copolymerized with vinyl chloride in amounts from 2 to 30% include vinyl acetate, vinylidene chloride, styrene, the alkyl fumarates including the dialkyl maleates, the alkyl maleates, the alkyl chloromaleates, the alkyl chlorofumarates, the alkyl acrylates and the alpha-substituted alkyl acrylates. Exceptional results, however, in the production of closed cell expanded plastics is obtained using polyvinyl chloride alone as the plastic.

The blowing agent that may be used in expanding plastisols of polyvinyl chloride and the polyvinyl chloride copolymers include any of the well-known nitrogen-producing blowing agents. For example, the blowing agents having the general formula (R,R'—C(CN)N:)₂ where R is methyl and hydrogen and R' is ethyl, n-propyl, isopropyl, n-butyl, isobutyl and carboxyethyl and as a specific agent alpha, alpha'-azobis-isobutyronitrile, diazoaminobenzene and the pentazdienes; benzene sulfonyl hydrazide; dinitrosopentamethylene tetramine and the organic carbonyl azides having the structural formula

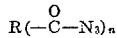

in which R is an organic radical and n is 1, 2 or 3. These azides may be prepared by converting the corresponding azide to the hydrazide which is then treated with nitrous oxide to form the azides or by treating the corresponding acid chloride with dry or an aqueous solution of sodium azide. The blowing agents may be used in amounts from 5 to 50 parts depending upon the degree of expansion desired. It is preferred to use about 30 parts of blowing agent per 100 parts of plastic.

The expanded plastics of this invention may be used in making life-saving equipment including life preservers and life boats and rafts.

The polyvinyl plastic is prepared for expansion by mixing it with a plasticizer. The plasticizer is used in amounts sufficient to produce a pourable mass. Generally, plasticizer in amounts between about 75 to 150 parts per one hundred parts of plastic is needed before the mixture becomes sufficiently pourable to pour into a mold so that the mass fills and takes the contour of the mold. The plasticizer should be light stable, colorless, insoluble in water, non-volatile, possess a high degree of retentivity, mutually miscible with the plastic over a large range of temperature, stable in air and chemically inert to attach by acids and alkalies. Plasticizers that may be used include dibutyl phthalate, dioctyl phthalate, octyl diphenyl phosphate, dioctyl sebacate, tricresyl phosphate, and others of a similar nature. The components of the blend may also be mixed on a mill to produce slabs of the blended ingredients, in which case plasticizers that are normally solid at room temperature, such as diphenyl adipate, may be used. Where polyvinyl plastics are used that are inherently soft and need not be softened by the addition of plasticizer, then a plasticizer may be omitted altogether. The mold may then be filled with pieces cut from the slab.

The term "polyvinyl chloride plastic" is used herein in a generic sense to refer to the polymers of vinyl chloride alone and to the copolymers of vinyl chloride with at least another polymerizable organic compound.

The low compression set possessed by the vinyl foam material of this invention permits its use as a mount for motors and instruments because of the ability of the foam to deaden sound produced by the vibration. The foam of this invention also finds use as a gasket material and as a carpet underlay because of the "spring back" action it exhibits after it has been released from compression forces.

While certain representative embodiments and details have been shown for the purpose of illustrating the invention, it will be apparent to those skilled in this art that various changes and modifications may be made therein without departing from the spirit or scope of the invention.

What is claimed is:

1. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic.

2. Closed cell nitrogen expanded stabilized and plasticized polyvinyl chloride plastic sponge containing from 5 to 25 parts per 100 parts of plastic of a paraffin wax having a melting point between 135° F. to 140° F. uniformly dispersed throughout the plastic.

3. Closed cell nitrogen expanded stabilized and plasticized plastic sponge consisting of polyvinyl chloride and containing from 5 to 25 parts per 100 parts of polyvinyl chloride of a solid wax having a melting point between about 120° F. to about 150° F. uniformly dispersed throughout the polyvinyl chloride.

4. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of another copolymerizable mono olefinic compound.

5. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of vinyl acetate.

6. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of vinylidene chloride.

7. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of styrene.

8. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of dialkyl maleate.

9. Closed cell nitrogen expanded stabilized and plasticized polyvinyl chloride plastic sponge containing from 5 to 25 parts per 100 parts of plastic of a solid wax having a melting point between about 120° F. to about 150° F. uniformly dispersed throughout the plastic, the polyvinyl chloride plastic being a copolymer of vinyl chloride and from 2 to 30% of an alkyl fumarate.

10. A method of making a closed cell gas expanded polyvinyl chloride plastic, which comprises adding from about 5 to about 25 parts per 100 parts of plastic of wax having a melting point between about 120° F. and 150° F. to a stabilized plasticized dispersion of a polyvinyl chloride plastic containing a nitrogen-producing blowing agent and enough plasticizer to permit the plastic to be poured into a mold, heating the plastic in a closed mold filled with the plastic to decompose the blowing agent, cooling the plastic, removing the cooled plastic from the mold and further heating the plastic until the desired expansion is obtained.

References Cited in the file of this patent

UNITED STATES PATENTS

| | | |
|---|---|---|
| 2,433,849 | Lathrop et al. | Jan. 6, 1948 |
| 2,503,003 | Simpson et al. | Apr. 4, 1950 |
| 2,518,454 | Elliott | Aug. 15, 1950 |
| 2,589,537 | Carpentier | Mar. 18, 1952 |
| 2,594,217 | Rogers et al. | Apr. 22, 1952 |
| 2,626,968 | Newell | Jan. 27, 1953 |